United States Patent [19]

Haase et al.

[11] Patent Number: 5,723,980
[45] Date of Patent: Mar. 3, 1998

[54] CLEARANCE MEASUREMENT SYSTEM

[75] Inventors: Wayne C. Haase, Acton; James K. Roberge, Lincoln, both of Mass.

[73] Assignee: Aerogage Corporation, Acton, Mass.

[21] Appl. No.: 476,084

[22] Filed: Jun. 7, 1995

[51] Int. Cl.$^6$ .................................................. G01R 27/26
[52] U.S. Cl. ........................ 324/662; 324/601; 324/671
[58] Field of Search ..................................... 324/661, 662, 324/663, 601, 671, 672

[56] References Cited

U.S. PATENT DOCUMENTS

| | | | |
|---|---|---|---|
| 2,575,710 | 11/1951 | Hardigg | 73/76 |
| 2,842,738 | 7/1958 | Warnick | 324/61 |
| 3,133,706 | 5/1964 | Mertz | 241/32 |
| 3,504,279 | 3/1970 | Foster et al. | 324/662 |
| 3,566,222 | 2/1971 | Caleb et al. | 317/246 |
| 3,928,796 | 12/1975 | Kaiser | 324/61 |
| 4,063,167 | 12/1977 | Duly | 324/61 |
| 4,122,708 | 10/1978 | Maier | 73/136 |
| 4,251,035 | 2/1981 | Chatwin et al. | 241/37 |
| 4,518,917 | 5/1985 | Oates et al. | 324/207 |
| 4,593,566 | 6/1986 | Ellis | 73/660 |
| 4,804,905 | 2/1989 | Ding et al. | 324/61 |
| 4,806,848 | 2/1989 | Demers | 324/662 |
| 4,813,273 | 3/1989 | Parsons | 73/118.1 |
| 4,823,071 | 4/1989 | Ding et al. | 324/61 |
| 4,831,071 | 5/1989 | Ward et al. | 524/401 |
| 4,922,757 | 5/1990 | Rozelle et al. | 73/660 |
| 4,958,129 | 9/1990 | Podiye et al. | 324/661 |
| 5,028,876 | 7/1991 | Cadwell | 324/661 |
| 5,065,105 | 11/1991 | Bruere et al. | 324/662 |
| 5,097,711 | 3/1992 | Rozelle et al. | 73/660 |
| 5,101,165 | 3/1992 | Rickards et al. | 324/662 |
| 5,119,036 | 6/1992 | Rickards et al. | 324/662 |
| 5,140,494 | 8/1992 | Slade | 361/212 |
| 5,287,063 | 2/1994 | Izawa | 324/601 |
| 5,481,914 | 1/1996 | Ward | 73/504.16 |

FOREIGN PATENT DOCUMENTS

| | | |
|---|---|---|
| 0653606A1 | 5/1995 | European Pat. Off. . |
| 2568004 | 1/1986 | France . |
| 2073427 | 10/1981 | United Kingdom . |

OTHER PUBLICATIONS

Kung, "A Digital Readou Technique for Capcitive Sensor Applications," *IEEE J. Solid–State Circuits*; 23:972–977 (1988).

Transistor Circuit Engineering Shea et al. Sep. 1957.

*Primary Examiner*—Maura K. Regan
*Attorney, Agent, or Firm*—Testa, Hurwitz & Thibeault, LLP

[57] ABSTRACT

The measuring device of the invention uses a capacitor polarized by a continuous voltage and conditioned by a continuous charge amplifier, this charge amplifier having a high-band filter structure, preferably of the second order. The technology of the capacitor and the linking cable is coaxial. The tuning of the chain measurement is effected theoretically without needing standardization.

20 Claims, 4 Drawing Sheets

CLEARANCE MEASUREMENT SYSTEM

The instant invention relates to a device for the dynamic measurement, by a capacitive method, of the distance between the opposed faces of the rotor and the stator of a rotating engine. The invention can be applied notably to the dynamic measurement of the radial space that exists between the spokes' extremity of a turboengine wheel and the wall of the casing containing the wheel.

The space residing between the opposed faces of the rotor and the stator of a rotating engine is an important parameter that influences notably on the engine's performance, no matter what type of rotating engine considered; this is the case particularly of the spaces between the spokes' extremity and the casing of compressors and turbines. These spaces vary widely with thermic and mechanical variations, it is essential for motorists to know the modifications of these spaces on the whole circumferential interface between the rotor and the stator, on a real working engine, in permanent or transitory regime. To effect the dynamic measurement of this space, it is know to use proximity capacitors which use electrical, optical or radio-wave phenomenon.

The invention relates to a device for the measurement by a method based on capacitive electrical phenomenon which measures the charge of a capacitor having a conducting surface fixed in the stator and opposed to the rotor, as well as a conducting surface of the rotor susceptible to being located opposed to the preceding one during the rotation of the rotor in relation to the stator.

The characteristics of the measuring device by capacitive methods depend on the type of polarization and on the type of conditioning of the capacitor.

Certain known measuring devices use a polarized capacitor by an alternative voltage conditioned by either an oscillator, or by a charge amplifier. In these devices, the technology of the capacitor and the linking cable between the capacitor and the chain measurement is generally tri-axial.

Other known measuring devices use a capacitor polarized by a continuous voltage conditioned by a voltage amplifier, the technology of the capacitor and the linking cable between the capacitor and the chain measurement is generally coaxial. In all of these known devices, the capacitor and the linking cable have residual capacities that intervene in the calibration of the chain measurement; the calibration need be done each time there is a change in the capacitor or the liking cable.

Also, all these known devices need standardization of the chain measurement on site which does not allow the manufacturer to calibrate in view of an reproducible in-line use.

Finally, for all these known devices, the result of the measurement is dependent on the temperature of the capacitor and the linking cable.

The goal of the invention is to create a measuring device which will permit measurement of the average space of the whole spoke system and the individual space of each spoke.

For this, the measuring device of the present invention uses a capacitor polarized by a continuous voltage and conditioned by a charge amplifier having a high-band filter structure, preferably of the second order. The technology of the capacitor and the linking cable is coaxial. The calibration of the chain measurement is done theoretically without having to do a standardization.

The device for the dynamic measurement of the space between the rotating spokes' extremity and the stator of a turboengine, comprises at least a capacitor to be mounted on the stator perpendicularly to the spokes and at least a chain measurement connected to the capacitor, the capacitor comprising an electrode to be used cooperatively with the spokes' extremity to define a capacitor with variable capacity each time a spoke passes under the electrode, the chain measurement having a conditioning device for the capacitor and means of treating the signal delivered by the conditioning device, characterized in that the conditioning device is a charge amplifier having a high-band filter structure, and that the capacitor and the amplifier are polarized by the same continuos voltage, said polarizing continuous voltage being determined so the average value of the output signal of the conditioning device be equal to a consigned voltage value.

Other characteristics and advantages of the invention will become apparent in the following description given as non limiting example and in the following drawings which represent in:

FIG. 1, a sectional view illustrating an example of a capacitor installed in a casing, in accordance with the invention;

FIG. 2, a scheme of an example of a conditioning device having a high-band filter structure of the first order, in accordance with a first embodiment of the invention;

FIG. 3, an example of a conditioning device having a high-band filter structure of the second order, in accordance with a second embodiment of the invention;

FIG. 4a, an example of an isolated spoke moving at a constant speed in front of an electrode of the capacitor;

FIG. 4b, the output signal of the conditioning device corresponding to the embodiment of FIG. 4a, according to the invention;

FIG. 5, a synoptic scheme of the chain measurement that permits the measurement of the individual space of each spoke, according to the invention;

FIG. 6, a synoptic scheme of the chain measurement that permits the measurement of the average space of the whole spoke system of the wheel when its geometry is perfectly known, according to the invention;

FIG. 7, a synoptic scheme of the chain measurement when the geometry of the whole spoke system is not known, according to the invention.

FIG. 1 represents a sectional view illustrating an example of the capacitor installed in a casing, according to the invention.

The capacitor is made with a technology coaxial. It comprise a central electrode 1 mounted in a garnished cable 2 with an insulant 3. the cable 2 is fixed in an opening made in the wall of the casing 4 in a manner that the surface of the electrode 1 is coplanar with the surface of the wall of the casing 4 opposed to the spokes 5. The cable comprises a housing grounded to the casing.

The electrode of the casing is connected, with a coaxial link 6, to a chain measurement that measures the value of the spaces J between the summit of the spokes 7 and the casing 4.

The summit of the spokes moves in front of the electrode of the capacitor in the direction shown by the arrow 8. The extremity of each spoke forms, with the electrode of the capacitor, a capacitor for which the capacity is a function of the distance which separates the spoke's extremity from the electrode. To measure the capacity, the capacitor is polarized by a continuous voltage and conditioned by a charge amplifier with continuous polarization.

FIG. 2 represents a schematic of an embodiment of the conditioning device having a high-band filter structure of the first order, according to a first embodiment of the invention.

The electrode 1 of the capacitor is connected by a coaxial link 6 to an charge amplifier polarized by a continuous voltage VP and having a high-band filter structure.

This charge amplifier comprises an operational amplifier 9 having a positive entry port fed by a continuous voltage VP, a negative entry port connected to the electrode 1 of the capacitive and brought to the same voltage than the positive entry port (basic principle of operational amplifier), and an output port furnishing an output signal Vs in function of the capacity due to the passages of the spokes' extremities under the capacitor. This capacity is variable in function of time: it is near zero when the spokes' summits are far from the electrode of the capacitor; it is maximal when one summit of a spoke is right underneath the electrode of the capacitor.

A resistor R and a capacitor C are connected in parallel between the negative entry port and the output port of the operational amplifier. The R and C values are chosen so the charge amplifier is a high-band filter having a frequency of $fc=1/(2\pi RC)$, inferior to the frequency of the passing spokes and superior to the frequency of the residual capacitance of the capacitor and the coaxial link. Then, only the variation of capacitance due to the passing spokes under the electrode of the capacitor is taken into account and the output signal Vs of the charge amplifier ins only function of the geometry of the capacitor composed of the electrode of the capacitor and the summit of one spoke, and of the electric gain of the charge amplifier and in particular of the integral capacity C.

In FIG. 2, the charge amplifier has a structure of high-band filter of the first order. To get better performances, it is preferable to use a conditioning device having a high-band filter structure of the second order. Such structure allows a better rejection of the possible parasitic low frequencies, to get a better dynamic and to effect a permanent control of the insulating resistance of the capacitor.

FIG. 3 is an example of a conditioning device having a high-band filter structure of the second order, according to the invention.

The conditioning device comprises an operational amplifier 9 having a negative entry port connected to the electrode of the capacitor, a positive entry port, and an output port, a resistor R6 connected between the positive entry port and the polarizing voltage VP and a resistor R5 connected between the positive entry port and the electric ground of the conditioning device, a capacitor C1 and a resistor R1 are connected in parallel between the negative entry port and the output port of the operational amplifier. The resistor R1 is made of two resistors R2 and R3 connected in line to a junction point I. A resistor R4 is connected between the point I and a point J, a resistor R7 is connected between the point J and the voltage VP, a capacitor C2 is connected between the point J and the electric ground of the conditioning device. The values of the various resistors are chosen so the continuous portion of the output signal Vs is zero, assuming that the value of the insulating resistance of the capacitor is infinite.

In this case, the gain of the conditioning device is $G=(1/C1)\times(R5/(R5+R6))$, and the output voltage of the conditioning device is $Vs=G.VP\Delta C$ spoke, where $\Delta C$ spoke represents the variation due to the passing spokes under the electrode of the capacitor.

This variation of capacitance is proportional to the surface s(x) of the capacitor composed by the electrode and the summit of the spoke opposed to the capacitor at the time of the measurement and inversely proportional to the space J, where x represents the position of the spoke in relation to the capacitor. In the following text the surface s(x) is called the common surface between the electrode and the spoke's summit.

In FIG. 4a shown is an example of an isolated spoke moving at a constant speed in front of an electrode of the capacitor; in FIG. 4b, shown is the output signal of the conditioning device corresponding to the situation depicted in FIG. 4a, according to the invention. The electrode of the capacitor shown in FIG. 4a has the shape of a disc with a radius r. The spoke's summit which passes in front of this electrode at a constant speed and following the direction x is approximated to a blade with parallel faces with a thickness e less than the diameter 2r of the electrode and an angle γ.

When the summit of the spoke is far from the electrode of the capacitor, there is no common surface between the electrode and the spoke's summit and the output signal of the conditioning device is null since it is a high-band filter which rejects the low parasitic waves inferior to the frequency of the passing spokes beneath the capacitor.

When the spoke's summit is underneath the electrode of the capacitor, the output signal Vs(x) of the conditioning device varies proportionally to the surface s(x) common between the electrode and the summit of the spoke. The output signal of the conditioning device has therefore the shape of an impulse with a maximal amplitude $\Delta$VS max proportional to the polarizing voltage VP and the common maximum surface is inversely proportional to the space J between the electrode and the spoke's summit. The wave's shape of the signal vs(x) is identical to the wave's shape of s(x).

In the case of a rotating spoke wheel with identical spokes spaced regularly, the output signal of the conditioning device is made of a succession of impulses with a recurring frequency equal to the frequency of the passing spokes under the electrode of the capacitor. Because of the high-band filter structure of the conditioning device, the average value of the signal is null. Therefore, when the geometrical characteristics of the ensemble made of the capacitor and the spokes and the surface smax are precisely known, the variations of the output signal of the conditioning device can be determined theoretically prior to the measurement. The tuning of the chain measurement is the done theoretically without needing standardization.

FIG. 5 depicts a synoptic scheme of the chain measurement permitting the measurement of the individual space of each spoke, according to the invention.

The chain measurement is connected to the electrode 1 of a capacitive by the means of a coaxial cable. It comprises, in line, a conditioning device 10, an amplitude measuring device 11, and a device 12 for computing the individual space J between each spokes. The measuring device 11 is meant to measure the maximal individual amplitude $\Delta$VS max of each impulse obtained in the output of the conditioning device 10. The device 12 for computing the individual space J is meant to compute the following equation:

$$J=(A.VP/\Delta VS\ max).Smax$$

where A is a constant equal to G.ϵo, where ϵo represents the dielectric constant of the insulant, generally made of dry air, of the capacitor formed by the spoke's summit and the electrode of the capacitor, assuming that the capacitor behaves like a planar capacitor.

The precise knowledge of Smax for each spoke can only be obtained when the thickness of each spoke is known with accuracy.

The precise measurement of the amplitude of each impulse can be made in a known way, for example, from the top of a synchronization, by effecting a first sampling of the signal immediately before the impulse and a second sampling of the signal when its value is closed to the impulse's maximum, then effecting the subtraction of the two values thus obtained.

FIG. 6 depicts a synoptic scheme of a chain measurement for the measurement of the average space of the spoke's system, when the spoke's system's geometry is perfectly known and when all the spokes are identical, according to the invention.

The chain measurement is connected to the electrode of a capacitive by a coaxial link. It is made of a an integral loop which comprises, in line, a conditioning device 10, a voltage amplifier 13 of the gain K, a wave filter 14 programmed depending on the speed of the rotating rotor of the turboengine so that the capacity of the filtration be constant no matter what the motor's regime N is, a device 15 for extracting the average value and a comparing device 16 to compare the value of the signal with a consigned value of voltage, the result issued from the comparison being transmitted to a integrating device 17 having a continuous infinite gain transmitters a value for the continuous voltage VP transmitted in return of the conditioning device 10 as the value of polarizing voltage.

The integral loop is therefore a loop for the regulation of the amplitude of the polarizing voltage VP of the conditioning device. This regulation is made such that at the equilibrium of the average value, after amplification and filtration, the output signal of the conditioning device is equal to the value of the consigned voltage V*.

The chain measurement also comprises a device 18 for the surveillance of the insulating resistance of the capacitor connected to a alarm device 19. The surveillance device 18 receives as input the values of the output voltage VS and the polarizing voltage VP of the conditioning device and compares these two values in order to detect a possible deterioration of the insulating resistance of the capacitor. When a deterioration is detected, the surveillance device 18 send to the alarm device 19 a signal to set it off.

The precise knowledge of the geometric characteristics of the ensemble made by the capacitive and spokes system allows to know with accuracy the average surface So common between the electrode and the spoke's summit. This average surface is mathematically computed from the evolution of s(x). In the cases where the spokes' summits can be considered as blades with parallel sides and where the electrode of the capacitor is circular, the equation for the average surface So is:

$$So = (\pi \cdot r^2 \cdot e)/(Xo \cdot \sin \gamma)$$

where r is the radius of the electrode of the capacitive, e is the thickness of the spoke, Xo is the distance separating the spokes, and $\gamma$ is the angle of the spoke.

The tuning of the chain measurement is then made in applying for value of the consigned voltage:

$$V = B.Bo^*(\text{filtered})$$

so that at equilibrium, the following equation is perfected (satisfied):

$$VP.A.(So(\text{filtered})/J). K = B.So^* (\text{filtred})$$

where B is a known coefficient obtained by computing for a particular value of the space and So* (filtered)=So (filtered), the capacity of filtration being the same as the one of the filter 14.

When the equilibrium is reached, the value of the polarizing voltage VP is proportional to the average space of the spokes' system because the capacity of filtration is constant whatever the speed of the rotating rotor of the turboengine. The value of the voltage VP delivered to the integrating device 17 is transmitted to a device 20 for the computing of the average space between the electrode of the capacitor and the spokes' summits.

What is claimed is:

1. A measurement system, comprising:

a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;

an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor, wherein the maxima includes a first noise component and the minima includes a second noise component;

a biasing network coupled between the amplifier and the sensor, the biasing network including a voltage source for providing a substantially constant voltage to the sensor; and a processor coupled to the amplifier for: (i) determining the difference between at least one of the maxima of the amplified output signal, and at least one of the minima of the amplified output signal wherein the first noise component and the second noise component are substantially canceled in determining the difference, (ii) determining the capacitance of the sensing capacitor by multiplying the voltage provided by the voltage source, by the gain provided by the amplifier, and by the difference between the at least one of the maxima of the amplified signal and the at least one of the minima of the amplified signal, and (iii) determining the distance between the sensor and each of the elements using the capacitance.

2. A measurement system according to claim 1, wherein the amplifier comprises a first operational amplifier, a first feedback capacitor, and a restoration circuit.

3. A measurement system according to claim 2, wherein the restoration circuit comprises a first resistor in parallel with the first feedback capacitor.

4. A measurement system according to claim 3, wherein the restoration circuit further comprises a second operational amplifier connected at its output to the first resistor, a second feedback capacitor, and a second resistor connected to the second operational amplifier, the second feedback capacitor, and ground.

5. A measurement system according to claim 4, wherein the housing comprises a turbine engine and the elements comprise fan blades.

6. A measurement system, comprising:

a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;

an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor, wherein each of the maxima and the minima include a substantially equivalent noise component;

a biasing network coupled between the amplifier and the sensor, the biasing network including a voltage source for providing a substantially constant voltage to the sensor, and a blocking capacitor for preventing the substantially constant voltage from being applied to the amplifier; and a processor coupled to the amplifier for determining the capacitance of the sensing capacitor and the distance between the sensor and each of the elements by determining the difference between at least one of the maxima of the amplified output signal and at least one of the minima of the amplified output signal, thereby eliminating the noise components of the maxima and minima, multiplying the voltage provided by the voltage source, by the gain provided by the amplifier, and by the difference between at least one of the maxima of the amplified output signal, and at least one of the minima of the amplified output signal.

7. A measurement system according to claim 6, wherein the amplifier comprises a first operational amplifier, a first feedback capacitor, and a restoration circuit.

8. A measurement system according to claim 7, wherein the restoration circuit comprises a first resistor in parallel with the first feedback capacitor.

9. A measurement system according to claim 8, wherein the restoration circuit further comprises a second operational amplifier connected at its output to the first resistor, a second feedback capicator, and a second resistor connected to the second operational amplifier, the second feedback capacitor, and ground.

10. A measurement system according to claim 9, wherein the housing comprises a turbine engine and the elements comprise fan blades.

11. A measurement system, comprising:

a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;

an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor;

a feedback circuit coupled between the amplifier and the sensor, and a voltage source applied to the feedback circuit, for providing a substantially constant voltage to the sensor;

a blocking capacitor coupled between the feedback circuit and the voltage source for substantially preventing the voltage source from providing a voltage at the amplifier; and a processor coupled to the amplifier, for determining the capacitance of the sensing capacitor and the distance between the sensor and each of the elements by multiplying the voltage provided by the voltage source, by the gain provided by the amplifier, and by the difference between at least one of the maxima of the amplified output signal, and at least one of the minima of the amplified output signal.

12. A measurement system according to claim 11, wherein the amplifier comprises a first operational amplifier, a first feedback capacitor, and a restoration circuit.

13. A measurement system according to claim 12, wherein the restoration circuit comprises a first resistor in parallel with the first feedback capacitor.

14. A measurement system according to claim 13, wherein the restoration circuit further comprises a second operational amplifier connected at its output to the first resistor, a second feedback capacitor, and a second resistor connected to the second operational amplifier, the second feedback capacitor, and ground.

15. A measurement system according to claim 11, further comprising a resistor in series with the blocking capacitor and the feedback circuit.

16. A measurement system according to claim 15, wherein the feedback circuit comprises a third operational amplifier and a third resistor.

17. A measurement system according to claim 16, wherein the housing comprises a turbine engine and the elements comprise fan blades.

18. A method of measuring distance, comprising:

providing a sensor disposed in a housing in which one or more elements are movable relative to the housing, the sensor and each of the elements being separated by a distance and forming a sensing capacitor having a capacitance dependent on the distance between the sensor and each element as each element passes the sensor and having substantially zero capacitance when no element is passing the sensor;

supplying substantially constant voltage to the sensor;

generating a signal with the sensor, the signal being representative of the capacitance of the sensing capacitor;

amplifying the signal generated by the sensor with an amplifier having a substantially constant gain to create an output signal having maxima and minima, the maxima corresponding to instances when an element passes the sensor and the minima corresponding to instances when no element is passing the sensor, wherein each of the maxima and minima have a noise component associated therewith;

preventing the substantially constant voltage from being applied to the amplifier;

determining the difference between at least one of the maxima of the amplified output signal and at least one of the minima of the amplified output signal and obtaining a difference value that is substantially free of the noise components; and determining the capacitance of the sensing capacitor and the distance between the sensor and each of the elements by multiplying the voltage provided by the voltage source, by the gain provided by the amplifier, and by the difference value.

19. A method of measuring distance according to claim 18, wherein the housing comprises a turbine engine and the elements comprise fan blades.

20. A method of measuring distance according to claim 18, further comprising determining the distance using the capacitance of the sensing capacitor.

* * * * *

UNITED STATES PATENT AND TRADEMARK OFFICE
CERTIFICATE OF CORRECTION

PATENT NO.   : 5,723,980
DATED        : March 3, 1998
INVENTOR(S)  : Haase et al.

It is certified that error appears in the above-identified patent and that said Letters Patent is hereby corrected as shown below:

Title page,
The title page should be deleted to appear as per attached title page.

Please delete columns 1-8 and substitute columns 1-12 as per attached.

Signed and Sealed this

Fourth Day of June, 2002

Attest:

Attesting Officer

JAMES E. ROGAN
Director of the United States Patent and Trademark Office ated>
United States Patent [19]

Haase et al.

[11] Patent Number: 5,723,980
[45] Date of Patent: Mar. 3, 1998

[54] CLEARANCE MEASUREMENT SYSTEM

[75] Inventors: Wayne C. Haase, Acton; James K. Roberge, Lincoln, both of Mass.

[73] Assignee: Aerogage Corporation, Acton, Mass.

[21] Appl. No.: 476,084

[22] Filed: Jun. 7, 1995

[51] Int. Cl.[6] ............................................. G01R 27/26
[52] U.S. Cl. ........................... 324/662; 324/601; 324/671
[58] Field of Search .................................... 324/661, 662, 324/663, 601, 671, 672

[56] References Cited

U.S. PATENT DOCUMENTS

| | | | |
|---|---|---|---|
| 2,575,710 | 11/1951 | Hardigg | 73/76 |
| 2,842,738 | 7/1958 | Warnick | 324/61 |
| 3,133,706 | 5/1964 | Mertz | 241/32 |
| 3,504,279 | 3/1970 | Foster et al. | 324/662 |
| 3,566,222 | 2/1971 | Caleb et al. | 317/246 |
| 3,928,796 | 12/1975 | Kaiser | 324/61 |
| 4,063,167 | 12/1977 | Duly | 324/61 |
| 4,122,708 | 10/1978 | Maier | 73/136 |
| 4,251,035 | 2/1981 | Chatwin et al. | 241/37 |
| 4,518,917 | 5/1985 | Oates et al. | 324/207 |
| 4,593,566 | 6/1986 | Ellis | 73/660 |
| 4,804,905 | 2/1989 | Ding et al. | 324/61 |
| 4,806,848 | 2/1989 | Demers | 324/662 |
| 4,813,273 | 3/1989 | Parsons | 73/118.1 |
| 4,823,071 | 4/1989 | Ding et al. | 324/61 |
| 4,831,071 | 5/1989 | Ward et al. | 524/401 |
| 4,922,757 | 5/1990 | Rozelle et al. | 73/660 |
| 4,958,129 | 9/1990 | Podiye et al. | 324/661 |
| 5,028,876 | 7/1991 | Cadwell | 324/661 |
| 5,065,105 | 11/1991 | Bruere et al. | 324/662 |
| 5,097,711 | 3/1992 | Rozelle et al. | 73/660 |
| 5,101,165 | 3/1992 | Rickards et al. | 324/662 |
| 5,119,036 | 6/1992 | Rickards et al. | 324/662 |
| 5,140,494 | 8/1992 | Slade | 361/212 |
| 5,287,063 | 2/1994 | Izawa | 324/601 |
| 5,481,914 | 1/1996 | Ward | 73/504.16 |

FOREIGN PATENT DOCUMENTS

| | | |
|---|---|---|
| 0653606A1 | 5/1995 | European Pat. Off. |
| 2568004 | 1/1986 | France |
| 2073427 | 10/1981 | United Kingdom |

OTHER PUBLICATIONS

Kung, "A Digital Readou Technique for Capcitive Sensor Applications," *IEEE J. Solid–State Circuits*; 23:972–977 (1988).

Transistor Circuit Engineering Shea et al. Sep. 1957.

*Primary Examiner*—Maura K. Regan
*Attorney, Agent, or Firm*—Testa, Hurwitz & Thibeault, LLP

[57] ABSTRACT

Disclosed are a system and method for the accurately calibrated non-contact capacitive measurement of small distances between relatively movable elements. The system and method are particularly well-suited for use in environments of high temperature, pressure, and vibration, including in jet engines to measure the gap between fan blades and the engine wall. A sensor disposed in a housing wall receives constant bias voltage and forms a sensing capacitor with the moving targets, which move past the sensor. A blocking capacitor allows a signal generated at the sensor to pass to a constant gain amplifier, which amplifies the signal and passes the amplified signal to a computer for calculating the small distances between the relatively movable elements using the bias voltage, the gain, and the maxima and/or minima of the amplified output signal.

20 Claims, 4 Drawing Sheets

CLEARANCE MEASUREMENT SYSTEM

BACKGROUND OF THE INVENTION

1. Field of the Invention

This invention relates to an efficient, accurately calibrated system for the non-contact measurement of small distances between two relatively movable elements based on the variation in capacitance between the elements. More particularly, the invention relates to a capacitive sensor system that continuously measures the clearance or gap between a large number of fast moving targets, such as the tips of a rotor blade in the turbine or compressor sections of a gas turbine engine, and the adjacent housing wall.

2. Description of Related Art

Numerous performance characteristics of gas turbine engines, such as fuel efficiency, compression ratio and thrust, depend strongly on the clearance or gap distance between the tips of the rotor blades and the adjacent housing. A number of different methods have been proposed to measure this gap, including eddy current, capacitance, magnetic proximity, optics and near-contact spark discharge. For example, eddy current sensors are described in U.S. Pat. Nos. 4,518,917 and 5,097,711. Single-electrode capacitive sensors are described in U.S. Pat. No. 4,813,273. Multiple-electrode capacitive sensors are described in U.S. Pat. Nos. 2,842,738, 4,063,167, 4,122,708, and 4,823,071. Capacitive sensors with integral electrical components are described in U.S. Pat. No. 5,119,036. Methods employing magnets embedded in the rotor blades are described in U.S. Pat. Nos. 2,575,710 and 4,922,757. An optical triangulation method is referenced in U.S. Pat. No. 4,823,071. A near contact electrical discharge method is referenced in U.S. Pat. No. 4,823,071. However, these measurement methods are either unsuitable to or are less effective in the hostile environment of equipment such as turbine engines, in which the sensors must be able to withstand temperatures exceeding 1000 degrees Centigrade, pressures in excess of twenty-five atmospheres, and excessive vibration. Furthermore, the high rotational speed of the blades in a turbine engine requires high bandwidth, which limits the signal-to-noise ratio of the measurement.

Past use of capacitive sensors in gas turbine engines has been ineffective for a number of reasons. Some capacitive sensor systems place an amplifier very close to the sensor, but these systems do not perform well in this environment because of the extremely high operating temperatures near the sensor. The sensor may experience temperatures in the 500 to 1000 degrees C. range, while a nearby amplifier may experience temperatures in the 100 to 400 degrees C. range.

Other capacitive sensor systems use electronic components, such as inductors or diodes, in the sensor in an effort to reduce the effects induced by temperature changes and vibration in the connecting cable between the sensor and amplifier. Such components are also intended to reduce the loading effect of cable capacitance. However, these electronic components are affected similarly by the high temperatures and vibration near the sensor, severely degrading system performance.

Other capacitive sensor systems (for example, those described in U.S. Pat. Nos. 4,122,708 and 4,831,071) use no electrical components in the sensor and have attempted to overcome the effects of vibration and high temperature on the interconnecting cable by means of guarding. These systems are based on the theory that vibration causes a change in the cable capacitance, and that providing a zero DC voltage between the cable center conductor and its shield should prevent vibration from creating an output signal.

In fact, guarding is not an effective solution because vibration of a cable causes more effects than simply a change in capacitance. If the dielectric material is slightly piezoelectric, then a bending of the cable will generate a charge or voltage difference between the cable center conductor and its shield. For example, all ferroelectric dielectrics (those whose molecules exhibit a dipole moment) are piezoelectric. Even quartz—one of the most stable of dielectrics exhibits piezoelectric effects without being ferroelectric due to a three-fold symmetry axis. In this situation, a zero DC voltage bias will not prevent an output signal due to vibration.

Similarly, if the dielectric material is slightly pyroelectric, then a temperature change will produce an output signal. A zero DC voltage again will not prevent the undesired output signal. Further, triboelectric effects, which arise due to very small sliding motions between the inner conductor, dielectric, and outer conductor of the cable, can cause a charge or voltage difference between the cable center conductor and outer shield. In many measurement situations, the change in the preamp output because of a change in the sensor capacitance resulting from a change in the measured parameter (e.g., blade tip clearance) is often of the same order of magnitude as the piezoelectric, triboelectric, and pyroelectric effects caused by cable vibration. None of the prior art systems are able to compensate for these effects.

Many capacitive measurement systems use modulation techniques to determine the value of the sensor capacitance. The frequency response of these systems is consequently constrained by the Nyquist criterion to be less than half of the modulation frequency. This restriction, in turn, severely limits their application to the measurement of rotating turbine blades.

In all of the above-mentioned measurement systems, calibration is accomplished by placing the sensor at one or several specific positions in front of a target and adjusting the output of the system so that it indicates the correct position. Thus the calibration methods are based on positions of known distance from the sensor. Calibration is therefore a cumbersome process which may require stopping the movable elements or fan blades in order to be performed. As disclosed in this specification, the calibration method of the present invention is substantially more convenient, and allows constant calibration without stopping the movable elements.

SUMMARY OF THE INVENTION

In a broad sense, the present invention relates to an efficient, accurately calibrated system for noncontact measurement of the distance between two relatively movable elements based on the variation in electrical capacitance between the two elements. More specifically, the present invention relates to a capacitive sensor system that continuously measures the clearance or gap between a large number of fast moving targets, such as gas turbine rotor blades, and their surrounding housing by use of a small, uncooled sensor. The variation in electrical capacitance between the sensor and the blade tip provides the mechanism for the measurement of the gap.

Therefore, an object of the present invention is to provide a measurement system having wide bandwidth and high signal-to-noise ratio, which enables measurements to be made on individual fast-moving elements or fan blades.

A further object of the invention is to provide a measurement system having a simple calibration mechanism and to maintain calibration accuracy over a long period of time (for example, in excess of 10,000 hours) even in the adverse environment of a gas turbine engine, which produces high temperature and pressure (for example, 1000 degrees C. and 25 atmospheres) and high vibration.

Another object of the present invention is to provide a simple sensor and connecting cable architecture and to allow for a large distance (for example, 10 to 50 feet) between the sensor and the first stage of electronic amplification; this in turn allows the amplifier to be remotely located from the movable elements in a more benign environment and uses minimal space within a housing.

A further object of the present invention is to reduce the sensitivity of the measurement to error signals caused by the environmental effects of temperature and vibration on connecting cables. Such error signals include but are not limited to those caused by changes in cable capacitance and charge or voltages induced by piezoelectric, triboelectric or pyroelectric mechanisms.

DETAILED DESCRIPTION OF THE PREFERRED EMBODIMENT

Figure 1:
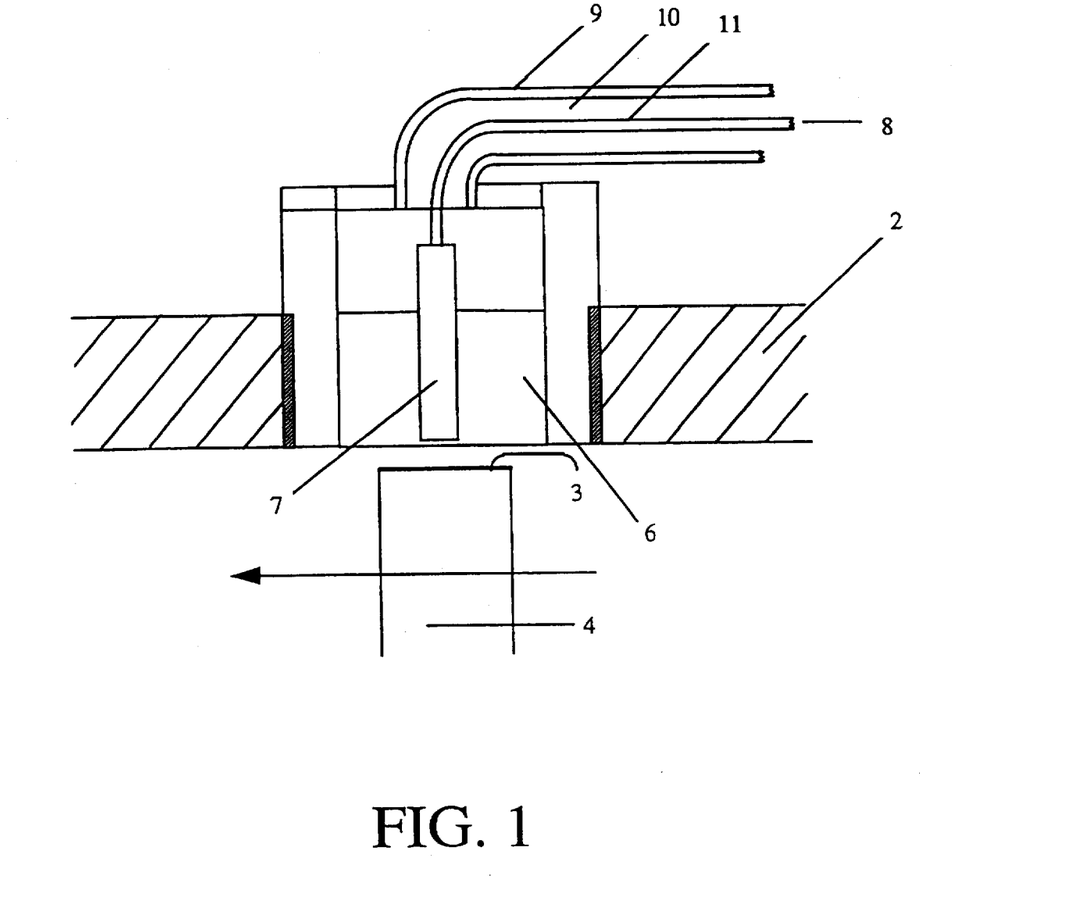
FIG. 1 shows a cross-sectional view of a sensor of the present invention embedded in the wall of a turbine engine housing, with a rotor blade passing the face of the sensor.

The present invention uses a non-contact, capacitive method to measure the gap between a sensor and a rapidly moving target or group of targets at substantially ground potential passing by the sensor. As an example, FIG. 1 shows a sensor 1, located in the outer wall 2 of a turbine engine, which faces the tip 3 of the rotating turbine or compressor blade 4. The three primary components of the sensor 1 are the outer electrode 5, the dielectric 6, and the inner electrode 7. The outer electrode 5 is connected both mechanically and electrically to the engine outer wall 2. The inner electrode 7 is electrically insulated from the outer electrode 5 by means of the dielectric 6. The physical shapes depicted in FIG. 1 may be modified to insure that the high pressures exerted inside the engine do not cause relative motion of the inner electrode 7 or dielectric 6. The use of a separate outer electrode 5 is not necessary, because the outer wall 2 can perform the function of the outer electrode.

As the turbine blade 4 passes the sensor inner electrode 7, a parallel-plate capacitor is formed. Ignoring fringing fields, the capacitance of this structure is described by Equation (1):

$$C_r = \epsilon A / D \quad (1)$$

where $\epsilon$ is the dielectric constant of the dielectric material 6 between the plates of the capacitor, A is the area of the face of the plates, and D is the distance or clearance gap between the plates. Thus by measuring the value of $C_r$, the value of the tip clearance or tip-to-wall distance D can be determined.

As shown below, deviations from Equation (1) because of fringing fields, variations in the shape of the physical parts, and the presence of insulating or conductive structures can be easily accommodated in more precise calculations of D.

For the method and apparatus used in the present invention, the basic measurement parameter, capacitance, should be asymptotic in nature. A plot of Equation (1) would show that the capacitance $C_r$ asymptotically approaches a constant value (zero) as the distance D increases without bound. This feature enables the present invention to accomplish an extremely accurate calibration of the measurement of D. The present invention does not require the more conventional calibration method of putting a target at a series of known distances in front of the sensor, and adjusting the system output. Instead, because $C_s$ is sufficiently close to a known value (in this case, zero) at a given point in the measurement cycle, the present invention achieves accurate measurements of D. Additionally, this known value enables the present invention to achieve excellent long-term stability of the measurement of D, without the need for stopping the engine and recalibrating.

A coaxial cable 8 is coupled to the sensor 1. The coaxial cable consists of an outer shield 9, a dielectric 10, and an inner conductor 11. The inner conductor 11 is electrically insulated from the outer shield 9 by the dielectric 10. The outer shield 9 is electrically connected to the sensor outer electrode 5. The inner conductor 11 is electrically connected to the sensor inner electrode 7.

Figure 2:
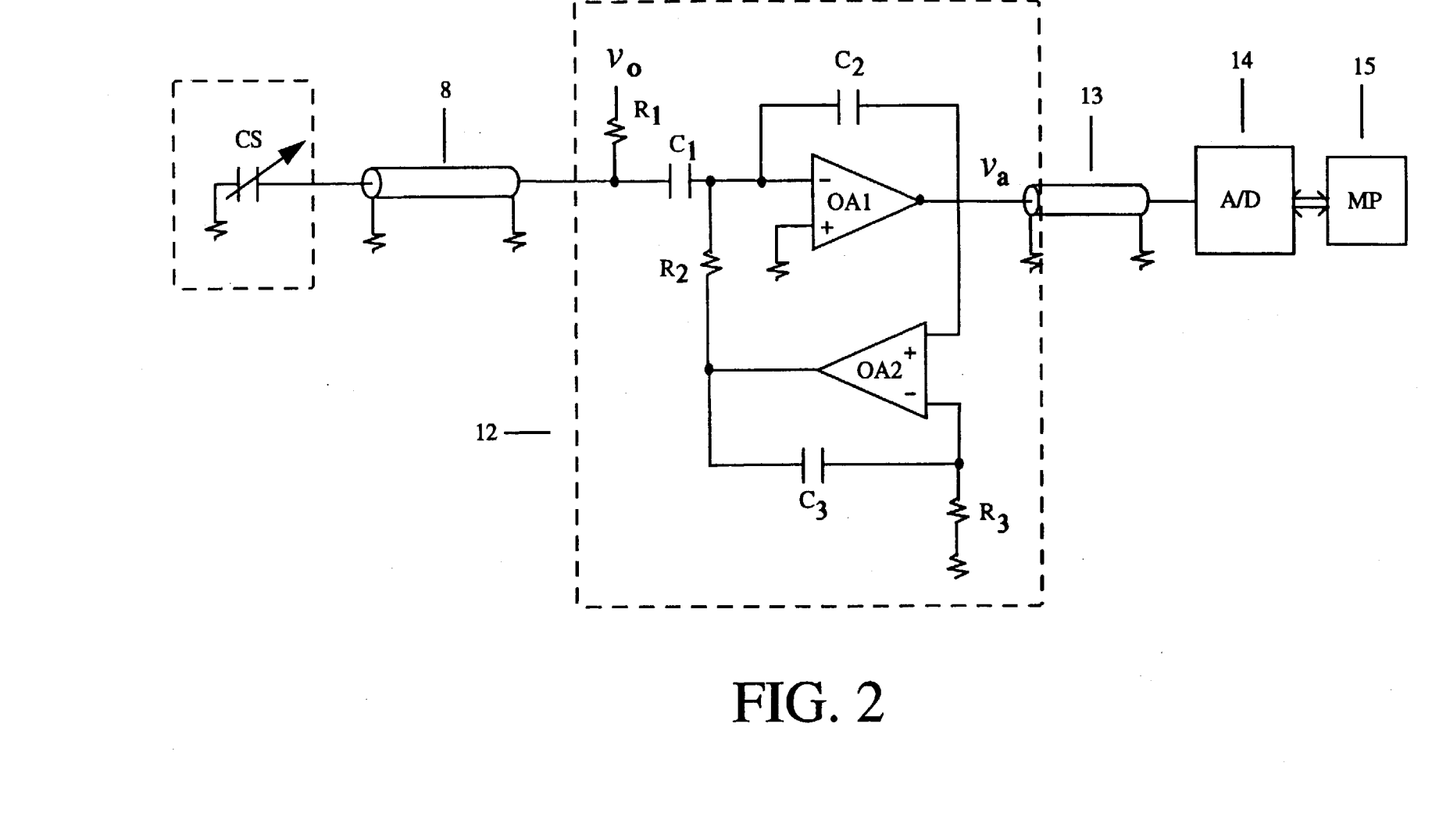
FIG. 2 is an electrical schematic diagram of a circuit that may be used in of one embodiment of the present invention.

In a preferred embodiment as shown in FIG. 2, a combination of analog and digital circuits perform the function of determining the value of the tip clearance D. Sensor 1 and cable 8 are connected to a charge amplifier 12, which generates an output voltage $V_A$. The output of charge amplifier 12 is connected by means of cable 13 to an analog-to-digital (A/D) converter 14, which is controlled by a microprocessor 15. In its simplest form, the charge amplifier 12 consists of operational amplifier $OA_1$ around which a feedback capacitor $C_2$ is connected. A DC restoration circuit prevents operational amplifier $OA_1$ from saturating. While the restoration could be accomplished by a single resistor in parallel with $C_2$, much better performance is obtained by the use of a circuit composed of operational amplifier $OA_2$, resistors $R_2$ and $R_3$, and capacitor $C_3$.

Charge amplifier 12 may also include series connected capacitor $C_1$, which acts as a blocking capacitor, and resistor $R_1$. When voltage $V_0$ is applied across resistor $R_1$, the network of resistor $R_1$ and capacitor $C_1$ allows a DC voltage to be applied to the inner electrode 7 of the sensor 1 but not to the amplifier input. Thus the polarity and value of the voltage $V_0$ can be set independently of the characteristics of amplifier $OA_1$, which is important because calculation shows that the gain of the system is proportional to $V_0$. Thus to achieve a high signal-to-noise ratio in the measurement, a large value of $V_0$ is desired, and this high value can be achieved by the apparatus and method of this invention.

In many measurement systems, the use of series-connected capacitor $C_1$ would normally introduce an AC coupling problem that would prevent accurate DC measurements. This problem occurs because series connected capacitor $C_1$ would normally cause the average voltage output at amplifier $OA_1$ to be constant, independent of the variation in gap. If the distance between sensor 1 and the blade tip 4 remained constant, then capacitor $C_1$ would normally prevent absolute calibration of the clearance gap D. Capacitor $C_3$ also would normally be capable of introducing AC coupling. However, the signal processing used in the present invention overcomes the AC coupling problem and is able to accomplish absolute calibration of the clearance gap D.

An additional feature of the present invention is that charge amplifier 12 can exhibit very high frequency response, which is necessary to allow separate measurements on each of the fast moving elements 4. Other methods that use a carrier frequency (typically 10 kHz to 1 MHz) result in a high frequency response that is even less than half the carrier frequency. In contrast, the use of a DC voltage in conjunction with the motion of the element or blade allows the measurement bandwidth to be as wide as the charge amplifier bandwidth, which can easily be up to 10 MHz for charge amplifiers built with commercially available integrated circuits, and even higher for charge amplifiers built with discrete components.

The output $v_A$ of charge amplifier 12 may be fed to an analog/digital converter 14 by means of a coaxial cable 13. The A/D converter 14 converts the output analog signal $v_A$ to digital form for subsequent processing. In practice, the cable 13 can be of substantial length (on the order of several hundred feet, if needed) to separate the converter 14 from the high temperature, high vibration environment of the moving elements, without degrading the performance of the system. If desired, the system can use a cable driver to allow even longer distances between the charge amplifier 12 and the analog/digital converter 14.

In a preferred embodiment, microprocessor 15 controls the sampling times of A/D converter 14 and performs the mathematical calculations that are used to determine clearance gap D. Microprocessor 15 calculates the value of the gap D using the exact relationship between gap D and the sensor capacitance $C_s$. Equation (1) describes this relationship for an ideal parallel-plate capacitor. For more typical capacitance structures, the D-$C_s$ relationship deviates from Equation (1) because of fringing fields and the exact shape of the sensor inner electrode 7, the rotating blade 4, the sensor dielectric 6, and the presence of any nearby conductive or insulating structures, such as the sensor outer conductor 5 and the engine outer wall 2. The exact relationship between D and $C_s$ can be either derived by known mathematical techniques or measured in laboratory test fixtures. In addition, any calculations related to the measurement of the gap D, such as spectral analysis, total indicated runout, non-repetitive runout, minimum gap, and average gap, can be performed by microprocessor 15. The use of a combination of analog and digital techniques thus provides additional capabilities in the measurement system.

Figure 3:
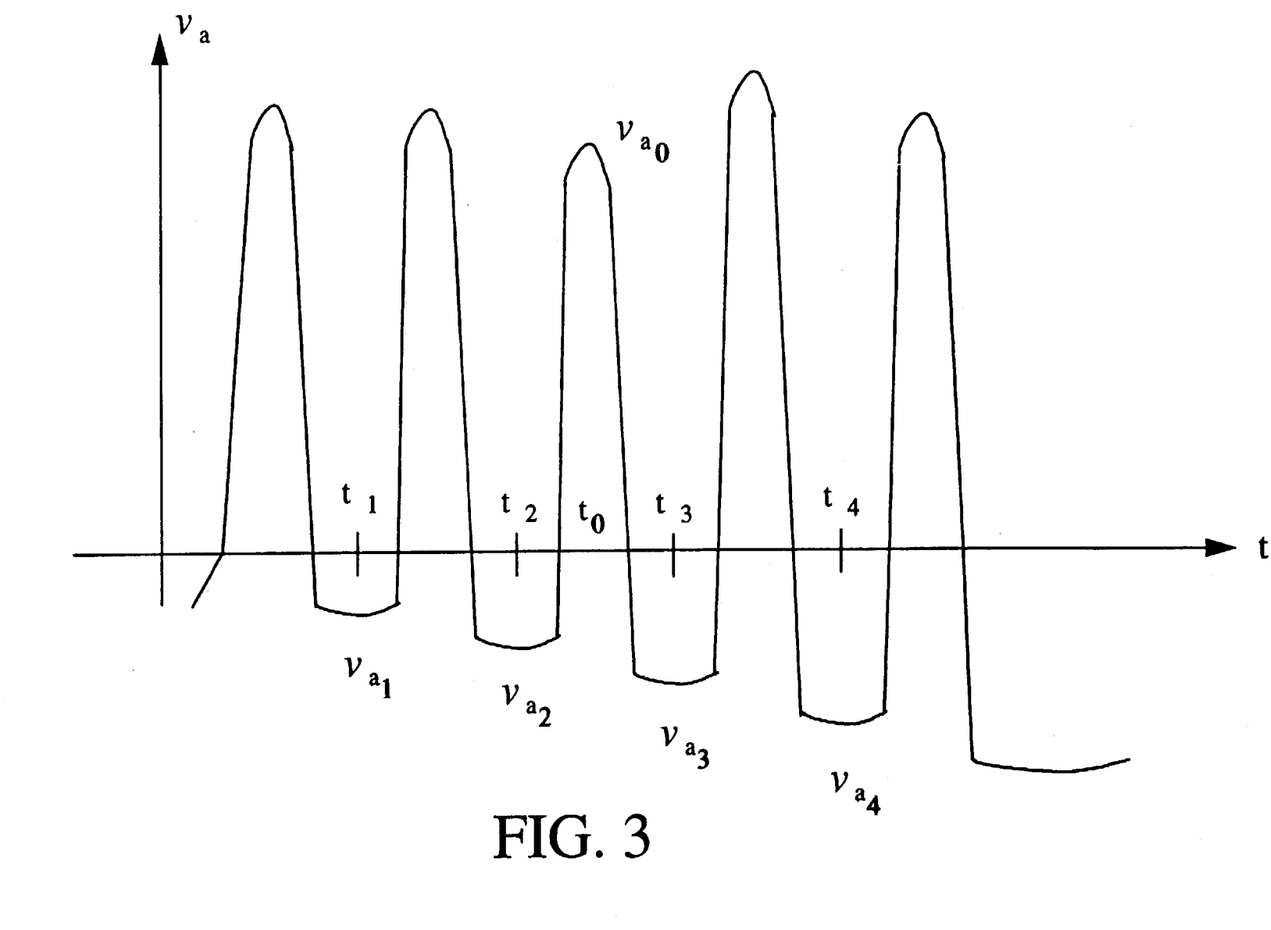
FIG. 3 shows a typical analog waveform for a sensor of the present invention at the output of the charge amplifier 12 of FIG. 2 which results from a plurality of turbine blades passing the sensor.

A typical waveform for the output voltage $v_A$ of charge amplifier 12 is shown in FIG. 3, which depicts the motion of several turbine blades past sensor 1. The figure shows several points in time labeled $t_0$ through $t_4$ and five corresponding voltage samples labeled $v_{A0}$ through $V_{A4}$. Together, these five voltage samples may be used to calculate the blade gap at time $t_0$, as shown in the following discussion. For the particular waveform shown in FIG. 3, the voltage $V_o$ is negative.

If constant voltage $V_o$ is applied to the center electrode 7 of the sensor 1, the current I required to maintain the voltage is defined by differential Equation (2):

$$I=dQ/dT \tag{2}$$

where $$Q=C_s V_o \tag{3}$$

and where $C_s$ is the capacitance of sensor 1. When the effects of the cable 8 between the sensor 1 and amplifier 12 are considered, Equation (3) becomes:

$$Q=(C_s+C_o)V_o+Q_n \tag{4}$$

where $C_o$ accounts for the cable and amplifier capacitance and $Q_n$ accounts for the various effects of the cable, including piezoelectric, pyroelectric and triboelectric charge-producing mechanisms. Combining Equations (2) and (4) yields:

$$I=(C_s+C_o)dV_o/dt+V_o\, dC_s/dt +V_o\, dC_o/dt+dQ_n/dt \tag{5}$$

In Equation (5), because the voltage $V_o$ is a constant, the first term on the right hand side is zero and the equation for current becomes:

$$I=V_o\, dC_s/dt+V_o\, dC_o/dt+dQ_n/dt \tag{6}$$

Charge amplifier 12 integrates the current to produce an output voltage $v_A$ which is defined by Equation (7) as:

$$v_A = G\int I\, dt \tag{7}$$

where G is a constant and represents the gain of the amplifier 12. For the amplifier schematic shown in FIG. 2, $$G=-1/C_2 \tag{8}$$

Combining Equations (6) and (7), $$v_A=G\, V_o\, C_s+G\, V_o\, C_o+G\, Q_n+K \tag{9}$$

where K is a constant of integration and includes such effects as amplifier offset voltage, as well as AC coupling effects because of capacitors $C_1$ and $C_3$.

In Equation 9, the first term (G $V_o$ $C_s$) represents the desired signal. The second term (G $V_o$ $C_o$) represents an undesired signal which results from changes in cable and amplifier input capacitances because of vibration and temperature changes. The third term (G $Q_n$) also represents an undesired signal which results from charge-producing mechanisms of the cable, including piezoelectric, pyroelectric and triboelectric mechanisms.

Figure 4:
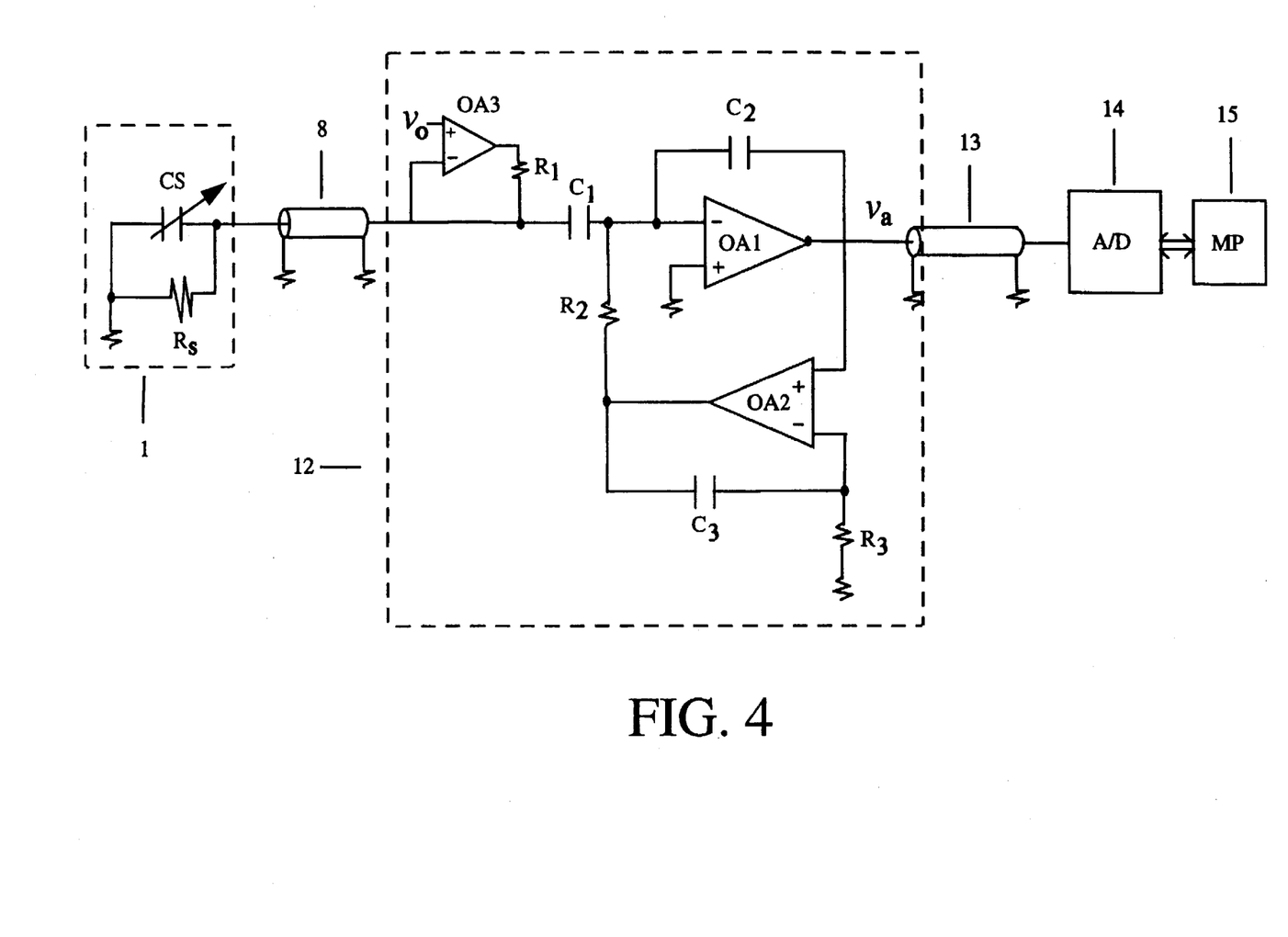
FIG. 4 is an electrical schematic diagram of a circuit that may be used in an embodiment of the present invention to compensate for a resistive path created in parallel with the sensor capacitance.

In addition, carbon deposits or other impurities on the sensor could create an undesired DC resistive path to ground in parallel with $C_s$, causing the voltage on sensor 1 to vary from $V_o$. This effect can be overcome either by measuring the voltage on $C_s$ and modifying the calculations, or by using a feedback circuit to force the voltage at sensor 1 to be equal to $V_o$. An example of such a feedback circuit is shown in FIG. 4, which shows a DC resistive path to ground as $R_5$ in parallel with $C_s$ and an operational amplifier OA$_3$ between $V_o$ and $R_1$.

If the blade tip 3 were in front of sensor 1 at all times, then there would be no way to distinguish any of the right hand terms in Equation 9. However, because a portion of time exists during which no blade is in front of the sensor 1, during this time the value of D in Equation (1) is very large and hence $C_s$ will be zero. If $C_o$, $Q_n$, and K are constant, then under Equation (9) the value of $v_A$ with no blade present would be:

$$v_A[\text{no blade}]=G\, V_o\, C_o+G\, Q_n+K \tag{10}$$

Subtracting the value of the amplifier output voltage when no blade is present ($V_a$ [no blade]) from the value when the blade is present ($V_a$) and solving for $C_s$ yields:

$$C_s=(1/G\, V_o)\, (v_A-v_A[\text{no blade}]) \tag{11}$$

The subtraction of Equation (11) overcomes the AC coupling problem previously discussed by removing from consideration the DC component of the amplifier 12 output voltage, that is, by removing from consideration the term K.

While the above discussion assumes that $C_s$ goes to zero when no blade is present, the calculations will still work where $C_s$ approaches some known value different from zero. This would be the case where, for example, the gap when no blade is present is not enough for $C_s$ to reach zero, but is still much larger than the gap when a blade is present. Accuracy using these calculations therefore depends upon uncertainty in the $C_s$ value when there is the largest gap, that is, when no blade is present.

In reality, the values of $C_o$ and $Q_n$ are generally not constant and are strongly affected by vibration. Therefore $C_o$ and $Q_n$ must be considered to be functions of time, and a more exact form of Equation (9) is:

$$v_A = G\,V_o\,C_s + G\,V_o\,C_o(t) + G\,Q_n(t) + K \quad (12)$$

Approximating the values of $C_o(t)$ and $Q_n(t)$ as a Taylor series about the time of a particular blade, shown as to in FIG. 3, improves the accuracy of the system substantially, as follows:

$$C_o(t) = C_{o0} + C_{o1}(t-t_0) + C_{o2}9(t-t_0)^2 + C_{o3}(t-t_0)^3 + \ldots \quad (13)$$

and $$Q_n(t) = Q_{n0} + Q_{n1}9(t-t_0) + Q_{n2}(t-t_0)^2 + Q_{n3}(t-t_0)^3 + \ldots \quad (14)$$

If, as shown in FIG. 3, the system measures the output voltage $v_A$ at times $t_1$ through $t_4$ and performs a weighted sum of the voltages ($v_{A1}$ through $v_{A4}$), the result will correct for all terms through the cubic in Equations (13) and (14). If the times are shown as in FIG. 3, then the particular solution is:

$$v_A[\text{no blade}] = (9(v_{A2}+v_{A3}) - (v_{A1}+v_{A4}))/16 \quad (15)$$

Thus:

$$C_s = (1/G\,V_o)\,(v_{A0} - (9(v_{A2}+v_{A3}) - (v_{A1}+v_{A4}))/16) + E \quad (16)$$

where E is an error that is due to terms in $t^4$ and higher for both $C_o$ and $Q_n$ and is quite small. Thus errors whose frequency components are small compared to the reciprocal of the sampling period (defined as the difference between sample times) are eliminated by the preferred method of the present invention.

If a particular vibration environment is more benign, then simpler methods of calculation can be used. For example, in the simplest situation, only two measurements (for example, at $t_0$ and $t_2$) can compensate for the zero-order errors in Equations (13) and (14) (that is, $C_{o0}$ and $Q_{n0}$). Similarly, the use of three measurements (at $t_0$, $t_2$ and $t_3$) can compensate for the first two error terms; in this case the appropriate calculation would be:

$$C_s = (1/G\,V_o)\,(v_{A0} - (v_{A2}+v_{A3})/2) + E \quad (17)$$

On the other hand, if the vibration is more severe, then terms of higher order than $t^4$ in Equations (13) and (14) could be accommodated by more baseline samples.

Generally speaking, error terms in $t^n$ in Equations (13) and (14) can be compensated for by making $(n+1)$ measurements at times during which no element or blade is in front of the sensor. There is no specific requirement that the additional measurements be each separated by element or blade measurements, and measurements can be taken more than once on a single element or blade, or on less than every element or blade.

Thus the system's ability to measure the tip capacitance $C_s$ depends on the ability to estimate what the amplifier output $v_A$ would have been at the blade measurement time if no blade were present. If this estimate can be performed accurately, then the system is able to measure $C_s$ with only two calibration constants, G and $V_o$, and both of these can be tightly controlled. The voltage $V_o$ can be generated by a precision voltage supply with excellent long term stability. As shown at Equation (8), the gain of the charge amplifier 12 depends only on the value of a single component ($C_2$ in the embodiment of FIG. 3), and the value of this component can also be tightly controlled. In addition, because amplifier 12 can be located away from the heat and vibration of an engine and in a more benign environment because the length of cable 8 can be quite large, changes in the value of $C_2$ caused by heat and vibration can be minimized. Maintaining tight control of the calibration constants G and $V_o$ produces excellent long term stability of the measurement and reduces the need to recalibrate the system of the present invention. For example, the possibility of maintaining accurate calibration for time periods in excess of 10,000 hours is quite feasible.

An additional advantage of the method and apparatus of the present invention is that errors due to amplifier offset voltage and amplifier input current are reduced virtually to zero. Thus the only errors in the measurement are those due to high-frequency terms in the cable and amplifier capacitance C and in the unwanted cable mechanisms $Q_n$. That is, in order to produce a measurement error, either $C_o$ or $Q_n$ must change rapidly compared to the sampling interval. For example, because the number of samples per revolution can be at least as high as the number of moving elements (typically 50 to 100 in the case of jet engine fan blades), the measurement techniques will compensate for cable effects up to frequencies on the order of 25 to 50 times the rotation rate of the turbine. In the case of the larger jet engines, the rotation rate is typically 5,000 to 10,000 RPM. Thus the present invention will be insensitive to cable effects up to about 5 kHz or higher. In the case of smaller engines, the rotation rate may be higher by a factor of five or more. In this case, the present invention will be insensitive to cable effects up to about 25 kHz or higher. Because cables are generally designed to be relatively insensitive to external vibration, the method in the present invention virtually eliminates errors from the interconnect cable 8 between the sensor 1 and the charge amplifier 12 as well as errors associated with the charge amplifier 12 itself.

If desired when measuring blade gap in an engine, a user can eliminate variations in blade gap D that are asynchronous with the rotation of the blade 4 by averaging the gap measurement of the same blade over successive rotations. Averaging would also improve the signal-to-noise ratio of the measurement by reducing the noise component by the square root of the number of measurements averaged. Similarly, the asynchronous motion could be estimated by calculating the variance of successive measurements of the same blade gap. Averaging over successive revolutions also improves the signal-to-noise ratio of blade profile measurements, which are made as multiple measurements at short intervals on a single blade.

While both the apparatus and method of this invention have been described in connection with several specific embodiments, it should be understood that numerous modifications in dimensions, materials and/or techniques could be made by persons of ordinary skill in this art without departing from the scope of this invention. Accordingly, the foregoing description is intended to be merely illustrative and is not limiting. The scope of the invention as claimed should be understood to include all those alternatives and 5,723,980

What is claimed is:

1. A measurement system, comprising:
   a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;
   an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor, wherein the maxima includes a first noise component and the minima includes a second noise component;
   a biasing network coupled between the amplifier and the sensor, the biasing network including a voltage source for providing a substantially constant voltage to the sensor; and
   a processor coupled to the amplifier for: (i) determining the difference between at least one of the maxima of the amplified output signal, and at least one of the minima of the amplified output signal wherein the first noise component and the second noise component are substantially canceled in determining the difference, (ii) determining the capacitance of the sensing capacitor by multiplying the voltage provided by the voltage source, by the gain provided by the amplifier, and by the difference between the at least one of the maxima of the amplified signal and the at least one of the minima of the amplified signal, and (iii) determining the distance between the sensor and each of the elements using the capacitance.

2. A measurement system according to claim 1, wherein the amplifier comprises a first operational amplifier, a first feedback capacitor, and a restoration circuit.

3. A measurement system according to claim 2, wherein the restoration circuit comprises a first resistor in parallel with the first feedback capacitor.

4. A measurement system according to claim 3, wherein the restoration circuit further comprises a second operational amplifier connected at its output to the first resistor, a second feedback capacitor, and a second resistor connected to the second operational amplifier, the second feedback capacitor, and ground.

5. A measurement system according to claim 4, wherein the housing comprises a turbine engine and the elements comprise fan blades.

6. A measurement system, comprising:
   a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;
   an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor, wherein each of the maxima and the minima include a substantially equivalent noise component;
   a biasing network coupled between the amplifier and the sensor, the biasing network including a voltage source for providing a substantially constant voltage to the sensor, and a blocking capacitor for preventing the substantially constant voltage from being applied to the amplifier; and
   a processor coupled to the amplifier for determining the capacitance of the sensing capacitor and the distance between the sensor and each of the elements by determining the difference between at least one of the maxima of the amplified output signal and at least one of the minima of the amplified output signal, thereby eliminating the noise components of the maxima and minima, multiplying the voltage provided by the voltage source, by the gain provided by the amplifier, and by the difference between at least one of the maxima of the amplified output signal, and at least one of the minima of the amplified output signal.

7. A measurement system according to claim 6, wherein the amplifier comprises a first operational amplifier, a first feedback capacitor, and a restoration circuit.

8. A measurement system according to claim 7, wherein the restoration circuit comprises a first resistor in parallel with the first feedback capacitor.

9. A measurement system according to claim 8, wherein the restoration circuit further comprises a second operational amplifier connected at its output to the first resistor, a second feedback capicator, and a second resistor connected to the second operational amplifier, the second feedback capacitor, and ground.

10. A measurement system according to claim 9, wherein the housing comprises a turbine engine and the elements comprise fan blades.

11. A measurement system, comprising:
    a sensor disposed in a housing in which one or more elements are movable relative to the housing, the sensor and each of the elements being separated by a distance and forming a sensing capacitor having a first value dependent on the distance between the sensor and each element as each element passes the sensor, and having a second value when no element is passing the sensor, the sensor generating a signal representative of the capacitance of the sensing capacitor;
    an amplifier coupled to the sensor and having a substantially constant gain, the amplifier amplifying the signal generated by the sensor to create an output signal which includes maxima and minima, the maxima corresponding to instances when an element passes the sensor and the minima corresponding to instances when no element is passing the sensor;
    a feedback circuit coupled between the amplifier and the sensor, and a voltage source applied to the feedback circuit, for providing a substantially constant voltage to the sensor;
    a blocking capacitor coupled between the feedback circuit and the voltage source for substantially preventing the voltage source from providing a voltage at the amplifier; and a processor coupled to the amplifier, for determining the capacitance of the sensing capacitor and the distance between the sensor and each of the elements by multiplying the voltage provided by the voltage source, by the gain provided by the amplifier, and by the difference between at least one of the maxima of the amplified output signal, and at least one of the minima of the amplified output signal.

12. A measurement system according to claim 11, wherein the amplifier comprises a first operational amplifier, a first feedback capacitor, and a restoration circuit.

13. A measurement system according to claim 12, wherein the restoration circuit comprises a first resistor in parallel with the first feedback capacitor.

14. A measurement system according to claim 13, wherein the restoration circuit further comprises a second operational amplifier connected at its output to the first resistor, a second feedback capacitor, and a second resistor connected to the second operational amplifier, the second feedback capacitor, and ground.

15. A measurement system according to claim 11, further comprising a resistor in series with the blocking capacitor and the feedback circuit.

16. A measurement system according to claim 15, wherein the feedback circuit comprises a third operational amplifier and a third resistor.

17. A measurement system according to claim 16, wherein the housing comprises a turbine engine and the elements comprise fan blades.

18. A method of measuring distance, comprising:

providing a sensor disposed in a housing in which one or more elements are movable relative to the housing, the sensor and each of the elements being separated by a distance and forming a sensing capacitor having a capacitance dependent on the distance between the sensor and each element as each element passes the sensor and having substantially zero capacitance when no element is passing the sensor;

supplying substantially constant voltage to the sensor;

generating a signal with the sensor, the signal being representative of the capacitance of the sensing capacitor;

amplifying the signal generated by the sensor with an amplifier having a substantially constant gain to create an output signal having maxima and minima, the maxima corresponding to instances when an element passes the sensor and the minima corresponding to instances when no element is passing the sensor, wherein each of the maxima and minima have a noise component associated therewith;

preventing the substantially constant voltage from being applied to the amplifier;

determining the difference between at least one of the maxima of the amplified output signal and at least one of the minima of the amplified output signal and obtaining a difference value that is substantially free of the noise components; and determining the capacitance of the sensing capacitor and the distance between the sensor and each of the elements by multiplying the voltage provided by the voltage source, by the gain provided by the amplifier, and by the difference value.

19. A method of measuring distance according to claim 18, wherein the housing comprises a turbine engine and the elements comprise fan blades.

20. A method of measuring distance according to claim 18, further comprising determining the distance using the capacitance of the sensing capacitor.

* * * * *